United States Patent [19]

Cherry et al.

[11] Patent Number: 4,937,085
[45] Date of Patent: Jun. 26, 1990

[54] DISCOLORATION PREVENTING FOOD PRESERVATIVE AND METHOD

[75] Inventors: Joe H. Cherry, Lafayette; Sheo S. Singh, West Lafayette, both of Ind.

[73] Assignee: Agra-Research, Inc., West Lafayette, Ind.

[21] Appl. No.: 240,414

[22] Filed: Sep. 1, 1988

Related U.S. Application Data

[63] Continuation of Ser. No. 896,970, Aug. 15, 1986, abandoned.

[51] Int. Cl.$^5$ .......................... A23B 7/10; A23B 7/154
[52] U.S. Cl. ..................................... 426/269; 426/310; 426/321; 426/637; 426/654
[58] Field of Search ............... 426/269, 268, 262, 321, 426/637, 654, 259, 310, 615; 252/400.20, 400.21, 400.23, 402

[56] References Cited

U.S. PATENT DOCUMENTS

| | | | |
|---|---|---|---|
| 2,011,465 | 2/1934 | Balls | 426/269 X |
| 2,628,905 | 2/1953 | Antle | 426/268 |
| 3,352,691 | 11/1967 | Li | 426/269 X |
| 4,084,008 | 4/1978 | Yueh | 426/473 X |
| 4,241,094 | 12/1980 | O'Neil | 426/637 X |
| 4,297,377 | 10/1981 | Harney | 426/473 X |
| 4,514,428 | 4/1985 | Glass | 426/321 |
| 4,590,080 | 5/1986 | Pinegar | 426/637 X |
| 4,659,576 | 4/1987 | Dahle | 426/331 X |

FOREIGN PATENT DOCUMENTS 2057355  5/1971  France ................ 426/269

OTHER PUBLICATIONS

Muneta, P., "Comparisons of Inhibitors of Tyrosine Oxidation in the Enzymatic Blackening of Potatoes"; Am. Pot. J. 58, 85: 1981.

Ahmad, M. M., El-Hakim, S., Shehata, A.; The Effect of Amino Acids on the Activity of Synergists and Antioxidants in Two Vegetable Oils, JAOC's, vol. 60, p. 420 A; Feb., 1983.

Reitmeier, C., Buescher, R. W.; Control of Brown End Discoloration of Snap Beans; Arkansas Farm Research; vol. 24, p. 12; 1975.

Primary Examiner—Kenneth M. Schor
Attorney, Agent, or Firm—Woodard, Emhardt, Naughton, Moriarty & McNett

[57] ABSTRACT

A food preservation composition comprising a combination of safe chemicals is effective in low concentrations and imparts no off-color taste to the foods with which it is used, yet effectively prevents the discoloration of vegetables such as potatoes. Citric acid and cysteine, combined in the ratio of about 1 part cysteine to about 25 to 30 parts citric acid, may effectively prevent the blackening of potatoes when applied in solutions of about 0.5 to 0.7 percent by weight in water. A water solution of cysteine and citric acid in which the citric acid does not exceed 1 percent by weight, and the cysteine does not exceed 0.05 percent by weight of the solution, effectively prevents such blackening. Citric acid/cysteine compositions are rendered even more effective in the presence of very low concentrations of ascorbic acid; for example, about 0.1 percent to about 0.3 percent by weight in the water solution. The further addition of essentially trace amounts of ethylenediamine tetraacetic acid; for example, about 0.01 percent to about 0.05 percent by weight in the solution, will permit the reduction of the weight percentage of cysteine in the solution to about 0.01 percent, and will further improve the efficacy of the composition.

3 Claims, No Drawings

DISCOLORATION PREVENTING FOOD PRESERVATIVE AND METHOD

This application is a division of application Ser. No. 896,970, filed Aug. 15, 1986.

BACKGROUND OF THE INVENTION

This invention relates to food preservatives to prevent the discoloration of physiologically injured fruits and vegetables, and is more particularly related to a food preservative which is effective to prevent the discoloration of cut potatoes prior to serving.

When a plant material such as fruit or vegetables is cut or physiologically injured, a brown or black discoloration appears at the site of the cut or injury within a few minutes. The discoloration of fruits and vegetables as a result of cutting and other preparation for human consumption is a problem of great economic importance in the food industry. The discoloration of such vegetable matter is unsightly and unappetizing, and is associated by the public with distastefully old food. This problem has become more acute with the popularity of fresh salad bars, commonly found at fast food outlets and restaurants in all price ranges. In order to satisfy the demand for fresh fruits and vegetables at salad bars, it is frequently necessary to cut the fruits and vegetables to edible size many hours before they may be consumed. The discoloration of such pre-prepared fruits and vegetables has required that they be treated to prevent their discoloration so that the restaurant customer will perceive an appetizing selection at the salad bar. The discoloration problem has been the subject of much study because of its great economic importance in the food industry. In fruits and vegetables, tyrosine or one of its oxidation products are the substrates most often implicated in the blackening of the injury site. The browning reaction of injured fruit and vegetables is more often attributed to o-hydroxyphenols, such as chlorgenic acid. Phenol oxidase or polyphenol oxidase enzymes have been reported to cause the discoloration in peaches, grapes, pears, avocados, apples and potatoes.

In 1979, it was reported that the total annual potato market was as much as 2.4 billion pounds. Because of their importance as a foodstuff, particular attention has been directed to the problem of discoloration of potatoes when they are cut. Both chlorgenic acid and tyrosine are present in potatoes, and tyrosine is thought to be responsible for the enzymatic blackening of potatoes.

The enzymatic blackening of potatoes and the effect of inhibitors of enzymatic oxidation were reported in "Comparisons of Inhibitors of Tyrosine Oxidation in the Enzymatic Blackening of Potatoes", Muneta, P., 1981, Am. Pot. J. 58, 85. Muneta indicates that the blackening of potatoes results from the enzymatic oxidation of tyrosine by polyphenol oxidase, a coppercontaining enzyme, and that in the presence of oxygen, the enzyme oxidizes tyrosine to 3,4,-dihydroxyphenylalanine (dopa), which is then rapidly oxidized by the enzyme to dopaquinone; and further that the dopaquinone cyclizes to 5,6,-dihydroxyindole derivatives which are oxidized to a reddish-brown orange "dopachrome" pigment which is seen in the early stages of enzymatic blackening. After the dopachrome formation, a series of non-enzymatic polymerizations, oxidations and reactions with protein form brown to purple, and finally the black malanin pigment. Enzymatic browning in fruit usually involves oxidation of o-hydroxyphenols such as chlorgenic acid instead of tyrosine.

Muneta reports that the chemical control of enzymatic blackening or browning involves the inhibition of the polyphenol oxidase activity by adjusting the pH, adding bisulfite or sulfhydryl compounds; the chelation of the copper from the polyphenol oxidase; the use of reducing compounds which reduce the wholequinones to the o-hydroxyphenol state; or chemicals which react with o-quinone to give colorless addition products.

Muneta tested and reported the effects of chemical inhibitors on the enzymatic oxidation of tyrosine using polyphenol oxidase obtained from potatoes. Muneta removed the polyphenol oxidase enzyme from potatoes by acetone precipitation, dialyzed and buffered the solution and measured the oxygen uptake to determine the rate at which the polyphenol oxidase enzyme oxidized a tyrosine substrate. As a result of his testing, Muneta reported that bisulfite was a very effective inhibitor of tyrosine oxidation. Muneta also indicated that cysteine, dithiothreitol and two sulfhydryl compounds temporarily inhibited the blackening. Muneta found that partial inhibition required twenty times the concentration of cysteine as dithiothreitol on a molar basis.

Muneta reported, however, that potatoes pose special problems because of the natural occurrence of o-hydroxyphenol such as chlorgenic acid, along with the tyrosine. The chlorgenic acid, without sufficient bisulfite and sulfhydryl compounds present, is oxidized to quinone which reacts with the inhibitor to reduce the effective inhibitor concentration, and permits the tyrosine oxidation to proceed. Thus, in order to inhibit the melanin blackening formation in the presence of chlorgenic acid and tyrosine, higher inhibitor concentrations are required.

Muneta also tested the effect of ascorbic acid on tyrosine oxidation, and reported that oxygen uptake was more rapid in the presence of ascorbic acid than when only tyrosine was oxidized. Muneta noted that the ascorbic acid inhibited blackening only temporarily by reducing the dopaquinone back to dopa.

Muneta summarized that from a food processor's standpoint, bisulfite is preferred to other chemical inhibitors, that cost and flavor problems are deterrents to the use of sulfhydryl groups such as dithiothreitol and cysteine, and that inhibitors such as ascorbic acid are not desirable because blackening will occur when the ascorbic acid is oxidized.

Although bisulfites have proven to be the most popular and widely used preservatives for fresh fruits and vegetables, the United States Food and Drug Administration has recently banned their use on fruits and vegetables including the use in restaurant salad bars effective August 8, 1986.

Other studies have been made of the problem of discoloration of fruits and vegetables. Among the studies, there is one reported by Cheryll Reitmeier and R. W. Buescher in *Arkansas Farm Research*, Vol. 24, 1975. The study by Reitmeier and Buescher indicated that carbon dioxide atmospheres of 10 to 20 percent could reduce the black and brown discoloration of snap beans at 75 degrees Fahrenheit and effectively prevent it for 48 hours at 60 degrees Fahrenheit, and suggested shipping snap beans with dry ice in commercial systems to both reduce the temperature and increase the carbon dioxide levels.

Reitmeier and Buescher also studied the effect of chemical materials in delaying the rate and intensity of the browning discoloration. Snap beans, which were washed and cut into sections, were sprayed or washed with solutions for 1 to 30 seconds. Browning discoloration was then evaluated on the residue from cut end tissues after the tissues had been homogenized and centrifuged. Reitmeier and Buescher tested a number of materials on the prepared bean residue. Citric acid in a 5 percent concentration was reported as providing a 67 percent inhibition after 24 hours, but a 13 percent inhibition after 48 hours. Cysteine in a 0.02 percent concentration was reported as demonstrating 100 percent inhibition after 24 hours, but 50 percent inhibition after 48 hours. Treatment with enriched carbon dioxide atmospheres and low temperatures was preferred because of the clearances needed for chemical treatments.

Commercially available food preservatives include compositions combining citric acid, calcium chloride, erythorbic acid, tricalcium phosphate, monocalcium phosphate; and materials for preventing the conversion of starch to sugar in sweet corn such as those disclosed in U.S. Pat. Nos. 3,837,837 and 3,876,412.

SUMMARY OF THE INVENTION

We have discovered a food preservation composition comprising a combination of safe chemicals which is effective in such low concentrations that the chemicals impart no off-color taste to the foods with which they are used, yet effectively prevent the discoloration of vegetables such as potatoes. It has been discovered that while both citric acid and cysteine themselves are ineffective to prevent the blackening of potatoes unless used in such high concentration levels as to lend their offensive tastes to the potatoes, they may be combined in the ratio of about 1 part cysteine to about 25 to 30 parts citric acid and may effectively prevent the blackening of potatoes when applied in solutions of about 0.5 to 0.7 percent in water. The invention permits a water solution of cysteine and citric acid in which the citric acid does not exceed 1 percent by weight, and the cysteine does not exceed 0.05 percent by weight of the solution to effectively prevent such blackening. We have further discovered that the citric acid/cysteine composition is rendered even more effective in the presence of very low concentrations of ascorbic acid; for example, about 0.1 percent to about 0.3 percent by weight in the water solution; and further that the addition of essentially trace amounts of ethylenediamine tetraacetic acid; for example, about 0.01 percent to about 0.05 percent by weight in the solution, will permit the reduction of the weight percentage of cysteine in the solution to about 0.01 percent and will further improve the efficacy of the composition.

An effective food preservative composition adapted for water solution and application to potatoes can comprise citric acid in weight percentage of about 60 to about 80 percent, cysteine in weight percentage of about 2 to about 4 percent, and ascorbic acid in weight percentage of about 10 to about 40 percent. Such a composition may be dissolved in water so that it provides about 0.5 to 0.7 percent by weight of the solution. Potatoes may be treated with the water solution of this composition and prevented from blackening significantly for up to six days, thus providing an effective method of preserving the appearance of cut potatoes.

A combination of citric acid, cysteine, ascorbic acid and ethylenediamine tetraacetic acid effectively prevents the blackening of potatoes. Individually, none of these chemicals either prevents the blackening of potatoes over a period of a week, or effectively prevents the blackening of potatoes for more than one day at best. The synergistic combination of citric acid and cysteine lies at the heart of this effective composition, but the addition of the ascorbic acid and ethylenediamine tetraacetic acid has a further synergistic effect in the long-term prevention of blackening. The combination permits each of these chemicals to be used at very low concentrations, well below levels where chemicals effect the taste of the food or have any other deleterious effect.

DETAILED DESCRIPTION OF THE INVENTION

The effect of citric acid was tested by making solutions of 0.25 percent by weight, 0.5 percent by weight, 1 percent by weight and 2 percent by weight of citric acid in deionized water. The solutions of 0.25 percent and 0.5 percent of citric acid in deionized water demonstrated no effect in preventing the blackening of the potatoes. The 1 percent solution of citric acid in deionized water showed a slight effect, and a 2 percent solution of citric acid in deionized water was required before effective prevention of blackening was obtained. Concentrations of 2 percent citric acid, however, create taste problems in the treated potatoes, and may not be used commercially.

In testing the effect of cysteine, solutions of 0.005 percent by weight through 0.1 percent by weight of cysteine in deionized and tap water were tested. The cysteine-deionized water solution produced an observable effect on the blackening of potatoes only at and above concentrations of 0.05 percent by weight of cysteine. Even at these concentrations of cysteine, its effect diminishes with time and the potatoes resume their blackening. Cysteine concentrations of 0.05 percent by weight, however, provide an off flavor and would be costly in use. In all these studies, it is important to note that cysteine in tap water gave the same results as with deionized water.

Ascorbic acid and ethylenediamine tetraacetic acid were also tested for their effectiveness in preventing the blackening of potatoes. Ascorbic acid was tested in solutions of up to about 0.5 percent by weight in deionized water, and ethylenediamine tetraacetic acid was tested in solutions of up to about 0.1 percent by weight in deionized water. Both ascorbic acid and ethylenediamine tetraacetic acid were ineffective in such concentrations in preventing the blackening of potatoes.

Surprisingly, it was discovered that low concentrations of cysteine and citric acid, when combined, were particularly effective in preventing the blackening of potatoes. Cysteine, in concentrations of 0.0125 percent by weight in deionized water, was combined with citric acid concentrations of from 0.025 percent to 1 percent by weight. The synergistic effect of cysteine and citric acid was demonstrated with citric acid concentrations at about the 0.1 percent level. However, the cysteine/citric acid combination was most effective when the citric acid in concentrations of about 0.5 percent to about 1 percent by weight were combined with cysteine at about 0.0125 percent by weight.

We further discovered that ascorbic acid in low concentrations, when combined with the cysteine/ citric acid combination, substantially increased the long-term prevention of blackening, and particularly when combined with ethylenediamine tetraacetic acid, which permitted a further reduction in the cysteine concentration. We discovered that up to about 0.3 percent by weight of ascorbic acid increased the effectiveness of the composition in combination with cysteine concentrations of 0.01 to 0.04 percent by weight and citric acid concentrations of 0.5 percent by weight. The best results were obtained when the ascorbic acid and cysteine were present in the solution in 0.3 percent and 0.01 percent by weight, respectively; or 0.1 percent and 0.02 percent by weight, respectively. Adding ethylenediamine tetraacetic acid to the solution in concentrations of only up to 0.05 percent by weight/volume, and preferably about 0.02 percent by weight/volume, permitted a reduction in the cysteine concentration to 0.01 percent.

To test the invention, potatoes were purchased from local grocery stores. The potatoes were washed and cut into small pieces, 2×1 cm. in size and 2 to 4 mm. thick. The cut potatoes were thoroughly mixed and were used for testing various compositions and their individual components as set forth below. The food preservative compositions and chemicals being tested were dissolved in deionized water.

The cut potatoes were divided into test samples and control samples. The test samples were exposed to the compositions and components being tested by immersing them in the compositions and components for about five minutes. The control samples were immersed in deionized water. It was found that if the cut potatoes were exposed to the material solutions for a time duration of about 5 minutes, further exposure time had no effect on the effectiveness of the material solutions in preventing blackening in the potatoes. After exposure to the composition and component solutions, the potatoes were collected and stored either at room temperature or at 4 degrees Centigrade. Thus, each cut potato sample was divided into two samples, one control sample with only deionized water treatment, and the other sample treated with the composition or component being tested. Visual observation of the control samples and test samples were made every day to determine the extent of discoloration of the cut potato tissue.

In a parallel experiment, an objective test of whiteness was also measured by using a Hunterlab colorimeter, Model No. D-25. A white tile was selected as a standard, having an L value of +92.9. An L value of 100 represents extreme whiteness, and an L value of 0 represents extreme blackness. The natural potatoes without any discoloration measured an L value of 73 immediately upon being cut.

Table 1 presents the measurement of the degree of whiteness of the potato samples immediately after cutting and at one day, two days and six days following treatment with the solution of deionized water, and each of the compositions and components included in Table 1. Table 1 reflects the testing of the percentage concentration indicated in the table of each of the chemicals and chemical compositions in deionized water. All percentages used in Table 1 and in this application indicate percentage weight to volume concentrations. Table 1 reflects an accurate comparison of the effect of each of the chemical materials upon the blackening of the potato slices. The numerical information presented in Table 1 corresponds in degree to the visual observations of the potatoes following their treatment. Untreated potatoes turned brown after a few hours, and by 24 hours they are black. The L value for black potatoes after one day is about 40 and stays at that level thereafter. (See Test No. 1) The difference in L values between naturally white and blackened potatoes has a value of about 30, and a difference in L values of 3 units is significant and detectable visually.

TABLE 1

| Test | Treatment Material, Concentration in Deionized Water[1] | Days | | | |
|---|---|---|---|---|---|
| | | 0 | 1 | 2 | 6 |
| 1. | No treatment | 73 | 41 | 38 | 38 |
| 2. | Deionized water | 73 | 52 | 50 | 48 |
| 3. | Citric acid, 0.5% | 73 | 62 | 58 | 54 |
| 4. | Ascorbic acid, 0.1% | 73 | 53 | 52 | 48 |
| 5. | EDTA, 0.02% | 73 | 54 | 50 | 48 |
| 6. | Cysteine, 0.02% | 73 | 53 | 53 | 52 |
| 7. | Cysteine, 0.02% - Ascorbic acid, 0.1% | 73 | 59 | 55 | 50 |
| 8. | Cysteine, 0.02% - EDTA, 0.02% | 73 | 57 | 55 | 51 |
| 9. | Ascorbic acid, 0.1% - EDTA, 0.02% | 73 | 55 | 52 | 47 |
| 10. | Cysteine, 0.02% - Citric acid, 0.5% | 73 | 71 | 67 | 59 |
| 11. | Formulation 1[2] | 73 | 72 | 67 | 64 |
| 12. | Ascorbic acid, 0.1% - Citric acid, 0.5% | 73 | 68 | 63 | 55 |
| 13. | EDTA, 0.02% - Citric acid, 0.5% | 73 | 67 | 62 | 54 |

[1] percent = weight to volume
[2] Citric acid, 0.5%; Ascorbic acid, 0.1%; Cysteine, 0.02%; and EDTA, 0.02%

As noted from Table 1, potato samples treated with only deionized water blackened from an L reading of 73 to an L reading of 52 after one day, and further blackened to L readings of 50 and 48 after two and six days, respectively. (See Test No. 2).

Treatment of the potatoes with a solution of 0.5 percent by weight/volume of citric acid in deionized water reduced the blackening and increased the L reading to 62 after one day, compared to control, but the blackening of the potatoes then continued, and the L value fell to 58 after two days and to 54 after six days. (See Test No. 3). Treatment of the potatoes with individual solutions of ascorbic acid, cysteine and ethylenediamine tetraacetic acid, respectively, in 0.1, 0.02, and 0.02 percents, respectively, by weight/ volume in deionized water appeared to be no more effective in preventing the blackening of the potatoes than deionized water alone. (See Test Nos. 4–6). None of these three materials in solutions of deionized water prevented blackening or a reduction in the L value from 72 to about 53 after 24 hours.

Solutions including cysteine and ascorbic acid in 0.02 and 0.1 percent, respectively, by weight/ volume in deionized water, cysteine and ethylenediamine tetraacetic acid in 0.02 percent each, respectively, by weight/volume in deionized water, and ascorbic acid and ethylenediamine tetraacetic acid in 0.1 and 0.02 percent, respectively, by weight/volume in deionized water, were each only slightly more effective than deionized water alone. (See Test Nos. 7–9). None of these three compositions in deionized water prevented the blackening of potatoes after two to six days.

A composition including 0.02 percent by weight/volume of cysteine and 0.5 percent by weight/ volume of citric acid in deionized water demonstrated an unexpected effectiveness in preventing blackening. Following treatment with this cysteine/citric acid combination, blackening of the potatoes was reduced, and an L value of 72 to an L value of 71 was obtained after one day, which compared favorably with the L value of 52 for deionized water and the L value of 62 after one day for the citric acid solution alone. After two days, the samples treated with cysteine and citric acid solution demonstrated an L value of 67, compared with an L value of 50 for deionized water and an L value of 58 with citric acid alone; and after six days, the cysteine/citric acid treated samples demonstrated an L value of 59 compared with L values of 48 for deionized water and 54 for deionized water and citric acid. (See Test No. 10).

Addition of ascorbic acid and ethylenediamine tetraacetic acid to the cysteine/citric acid solution decreased even further the blackening after two days, and increased the L value of the cysteine/citric acid treatment from 59 to 64. (See Test No. 11). Erythorbic acid may be substituted for ascorbic acid in the same weight/volume concentrations with no significant reduction in effectiveness.

We have found the following to be examples of particularly effective compositions which are adapted for solution in water and application to potatoes.

Example 1:

A composition includes 78.4 percent by weight of citric acid, 3 percent by weight of cysteine, 15.6 percent by weight of ascorbic acid, and 3 percent by weight of ethylenediamine tetraacetic acid. These four chemicals are mixed until uniformly distributed. When the composition is dissolved in deionized water in an amount from 0.5 to 0.6 percent by weight of the total formulation, it provides a food preservative which will prevent the blackening of potatoes so that the original L value of 73 is reduced to an L value of 72 after one day, an L value of 67 after two days, and an L value of 64 after six days, which is the most effective anti-blackening composition tested.

Example 2:

A composition was prepared by uniformly mixing together 70.5 percent by weight of citric acid, 2.4 percent by weight of cysteine, 11.8 percent by weight of ascorbic acid, 3.5 percent by weight of ethylenediamine tetraacetic acid, and 11.8 percent by weight of sodium acid pyrophosphate or tetrasodium acid pyrophosphate. A uniform mixture of these five chemicals is dissolved in deionized water to produce a 0.6 to 0.7 percent by weight solution. Cut potatoes immersed in the solution of Example 2 demonstrate the same L levels as obtained with Example 1, substantially preventing the blackening of potatoes for up to six days.

Potatoes treated with this invention maintain a natural white color, having L values of 64-72 for up to six days after cutting. It is interesting to note that the ascorbic acid/citric acid composition, while decreasing blackening in the first day, did not provide a significant anti-blackening effect over a six-day period. (See Test No. 12). Likewise, while the ethylenediamine tetraacetic acid/citric acid composition decreased blackening after one day, it did not provide a significant anti-blackening effect over a six-day period. (See Test No. 13). Only the cysteine/citric acid combination of this invention, and particularly the cysteine/citric acid/ascorbic acid/ethylenediamine tetraacetic acid combination of this invention provided no blackening for 24 hours and no significant blackening over periods of up to six days. The invention is also effective in preventing blackening of frozen potatoes, and may prevent significant blackening of frozen potatoes.

The combination of this invention thus provides a particularly effective commercial food preservative which is usable in very small concentrations to safely, cheaply and effectively prevent the discoloration and blackening of vegetables and fruits such as potatoes for long periods of time. It also provides the food industry with a significant alternative to bisulfites and other food preservatives. Each of the ingredients of the invention is from the Food and Drug Administration's list of materials generally recognized as safe.

We claim:

1. A method of preventing the discoloration of potatoes comprising cutting the potatoes for consumption and exposing the cut potatoes to a solution consisting essentially of citric acid in a weight percentage concentration of from about 0.5 percent to about 1.00 percent of the solution and cysteine in a weight percentage of about 0.01 percent to about 0.04 percent of the solution, and the remainder water, said exposing including contacting said potatoes with said solution for a time sufficient such that the contacting of the potatoes with said solution prevents discoloration of said potatoes when said potatoes are exposed to an atmosphere which would cause discoloration in the absence of said contacting.

2. The method of claim 1 wherein said solution includes ascorbic acid in a weight concentration of from about 0.1 percent to about 0.3 percent of the solution.

3. The method of claim 2 wherein said solution includes ethylenediamine tetraacetic acid in a weight concentration from about 0.005 percent to about 0.02 percent of the solution.

* * * * *